United States Patent
Bybee et al.

(10) Patent No.: US 8,468,170 B2
(45) Date of Patent: Jun. 18, 2013

(54) CREATING AD HOC RELATIONSHIPS BETWEEN ENTITIES

(75) Inventors: Andrew Bybee, Kirkland, WA (US); Derik Stenerson, Redmond, WA (US); Denis Seniuc, Bellevue, WA (US); Kalmadi Santhosh Rao, Redmond, WA (US); Shashi Ranjan, Redmond, WA (US)

(73) Assignee: Microsoft, Redmond, WA (US)

( * ) Notice: Subject to any disclaimer, the term of this patent is extended or adjusted under 35 U.S.C. 154(b) by 365 days.

(21) Appl. No.: 12/335,197

(22) Filed: Dec. 15, 2008

(65) Prior Publication Data

US 2010/0153471 A1    Jun. 17, 2010

(51) Int. Cl.
    *G06F 17/30*    (2006.01)
(52) U.S. Cl.
    USPC ........... 707/793; 707/706; 707/713; 707/722; 707/736; 707/758; 707/781; 707/792; 707/797; 707/798; 707/799; 707/800; 707/801; 707/802
(58) Field of Classification Search
    USPC ................ 707/706, 713, 722, 736, 758, 781, 707/792, 793, 797, 798, 799, 800, 801, 802
    See application file for complete search history.

(56) References Cited

U.S. PATENT DOCUMENTS

| | | | |
|---|---|---|---|
| 5,787,415 A * | 7/1998 | Jacobson et al. | ................... 1/1 |
| 6,732,100 B1 | 5/2004 | Brodersen et al. | |
| 6,742,004 B2 | 5/2004 | Sabatini et al. | |
| 6,766,329 B1 | 7/2004 | Nicholson | |
| 7,158,971 B1 * | 1/2007 | Bascom | ................... 1/1 |
| 2004/0194112 A1 * | 9/2004 | Whittenberger et al. | ...... 719/310 |
| 2005/0234931 A1 * | 10/2005 | Yip et al. | ................... 707/100 |
| 2006/0020507 A1 | 1/2006 | Sagey | |
| 2006/0101071 A1 * | 5/2006 | Henderson | ................ 707/104.1 |
| 2006/0168577 A1 * | 7/2006 | Melo et al. | ................... 717/168 |
| 2007/0005583 A1 | 1/2007 | Chau et al. | |
| 2007/0214179 A1 * | 9/2007 | Hoang | ................ 707/104.1 |
| 2008/0140684 A1 * | 6/2008 | O'Reilly et al. | ............. 707/100 |
| 2009/0240714 A1 * | 9/2009 | Keith et al. | ................... 707/100 |

OTHER PUBLICATIONS

Cohen, Oshri, "Create Relationships in CRM 3.0 Programmatically", Retrieved at <<http://mymscrm3.blogspot.com/2008/01/create-relationships-in-crm-30.html>>, Jan. 14, 2008, pp. 1-2.

Lemmen, Ronald, "Many-to-Many Relationships in MS Dynamics CRM 3.0", Retrieved at <<http://blogs.msdn.com/crm/archive/2007/02/15/many-to-many-relationships-in-ms-dynamics-crm-3-0.aspx>>, Oct. 10, 2008, pp. 1-9.

"Titanium White Paper", Retrieved at<<http://www.mdbs.com/html/titanium_whitepaper.html>>, Oct. 10, 2008, pp. 1-19.

(Continued)

*Primary Examiner* — Syling Yen
(74) *Attorney, Agent, or Firm* — Turk IP Law, LLC

(57) ABSTRACT

Users are enabled to quickly and easily associate records representing entities such as themselves, other users, contacts, accounts, teams/groups, and similar ones employing a record of the association and assign each entity a role or other attributes as a part of this association. Relationship records and attributes preserving entity association information allow teamwork, communication, and collaboration for effective management of business processes. The records and attributes also enable visualization and facilitate deeper understanding of the relationships between people, data, and business processes.

20 Claims, 9 Drawing Sheets

OTHER PUBLICATIONS

"Course 8910: What's New in Microsoft Dynamics CRM 4.0", Retrieved at <<http://www.mtccrm.com/CRM-Literature/EN_Whats_New_in_CRM_Student_Manual.pdf, Dec. 2007, pp. 184.

"Microsoft CRM Product Architecture", Retrieved at <<http://www.iteration2.com/centralnav/DocumentLibrary/CRM/MS-CRMProductArchitecture.pdf>>, White Paper, Apr. 2003, pp. 1-36.

* cited by examiner

CREATING AD HOC RELATIONSHIPS BETWEEN ENTITIES

BACKGROUND

Customer Relationship Management (CRM) solutions provide tools and capabilities needed to create and maintain a clear picture of customers, from first contact through purchase and post-sales. For complex organizations, a CRM system may provide features and capabilities to help improve the way sales and marketing organizations target new customers, manage marketing campaigns, and drive sales activities. CRM systems may include many components, hardware and software, utilized individually or in a shared manner by users internal or external to the organization.

CRM systems are an example of computing systems where entities such as persons, organizations, accounts, and similar ones are tracked for various purposes. While many solutions exist for tracking attributes of entities such as a role of a business contact, conventional entity relationship models are typically incomplete. Attributes on relationships are not supported in a generic manner. Accordingly, ad-hoc relationships between people/businesses (users, contacts, accounts, etc.) and business entities in a system may not be captured, may only be captured in unstructured form (e.g. notes), or partially captured through explicitly defined and rigid schemas. The lack of these abilities makes it difficult to effectively use CRM to manage business relationships effectively.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to enabling users to quickly and easily associate records representing entities such as themselves, other users, contacts, accounts, teams/groups, and similar ones employing a record of the association and assign each a role or other attributes as a part of this association. Relationship or "connection" records and attributes may be used to facilitate teamwork, email, and collaboration for effective management of business processes. Connection records and attributes may also be employed to visualize and facilitate deeper understanding of the relationships between people, data, and business processes.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
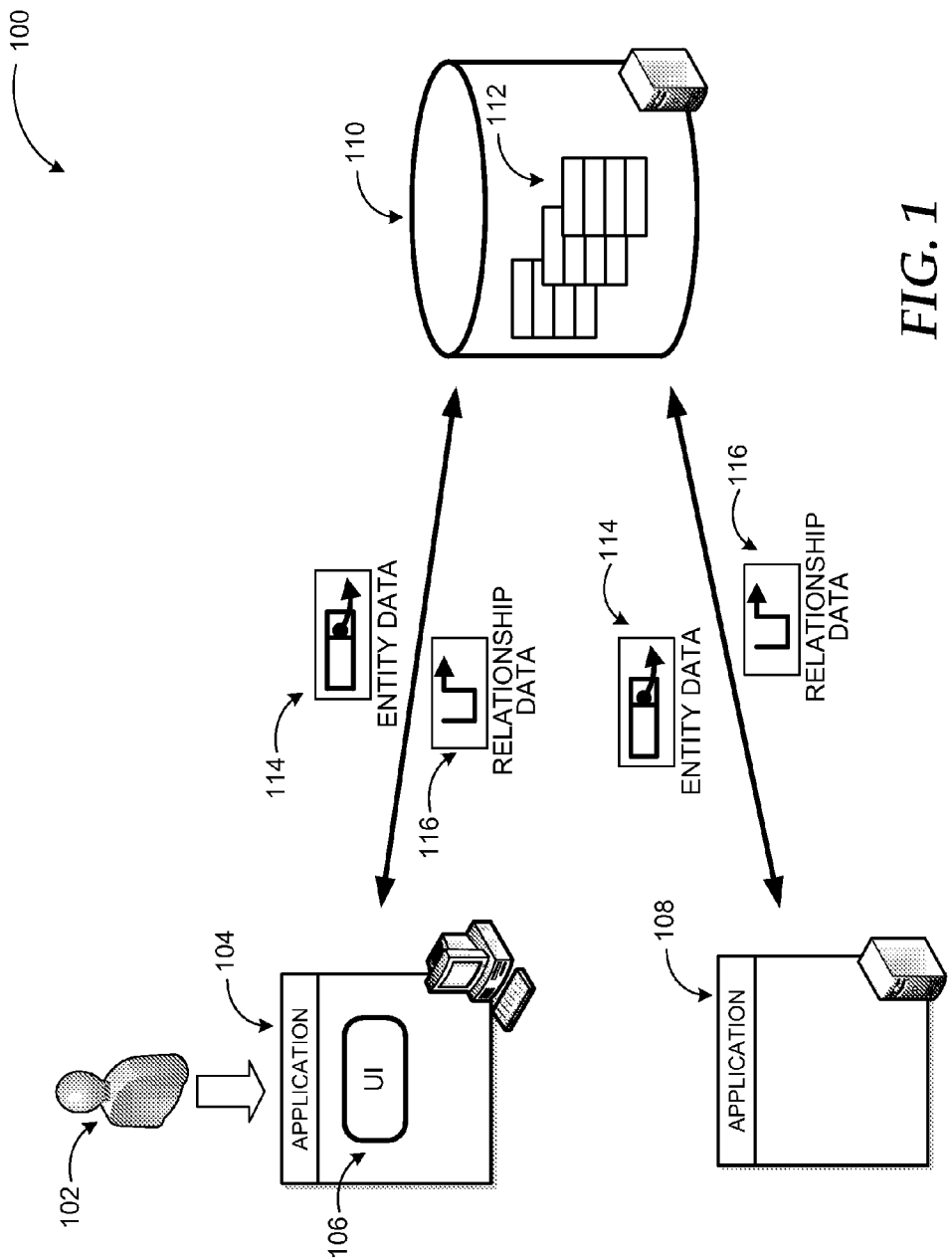
FIG. 1 is a conceptual diagram illustrating creation and use of relationship records along with entity records in a computing system.

As briefly described above, a relationship data model may be used to enable users to associate records that represent themselves, other users, contacts, accounts, and teams/groups to a record and assign each a role or other attributes as a part of this association, in effect forming an "ad-hoc relationship." In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media. The computer program product may also be a propagated signal on a carrier (e.g. a frequency or phase modulated signal) or medium readable by a computing system and encoding a computer program of instructions for executing a computer process.

Throughout this specification, the term "platform" may be a combination of software and hardware components for managing entity and relationship related data. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 is a conceptual diagram illustrating creation and use of relationship records along with entity records in a computing system. In an entity based data management system like a CRM system, information is tracked based on predefined entities, groups, and their attributes.

For example, account teams in a business may include many stakeholders, including account managers, partner account managers, partner technical specialists, external consultants, executive sponsors and so on. These roles are not attributes of related contacts or users, but are attributes that only come to existence in the context of a relationship to the account—e.g. John might be the account manager for the Contoso account, and the "technical specialist" for the Fabrikam account.

To capture and preserve relationship based information such as ad hoc connections, their attributes, and attributes of entities based on relationships, an "any to any" relationship model is enabled at the data level according to some embodiments. Thus, any entity type may be configured to have a "connection relationship" to any other entity. The connection itself may be represented in a single customizable "intersect" table, enabling efficient queries over the connection data. As a result, all such relationships to a given entity may be enumerated. Having the relationship based entity attribute data and the relationship data itself available for consumption, a system may use the data to analyze, forecast, report, and present dynamic relationships between the entities.

In diagram 100, user 102 is one example source for data input. User 102 may provide new entity information, create new relationships, or modify existing information through user interface 106 of application 104. An alternative source of new information is application 108, which may generate new data or modify existing data automatically. For example, application 108 may analyze business data for a given organization and determine entities and relationships automatically.

Entity data 114 and relationship data 116 may be provided to data store 110 by applications 104 and 108. The data may be stored in tables 112, data cubes, and other storage formats by data store 110. Applications 104 and 108 may also retrieve entity data 114 and relationship data 116 from data store 110 for analysis, forecasting, data mining, and similar purposes. The analyzed data may be presented to user 102 through a display, a printout, or other forms.

Figure 2:
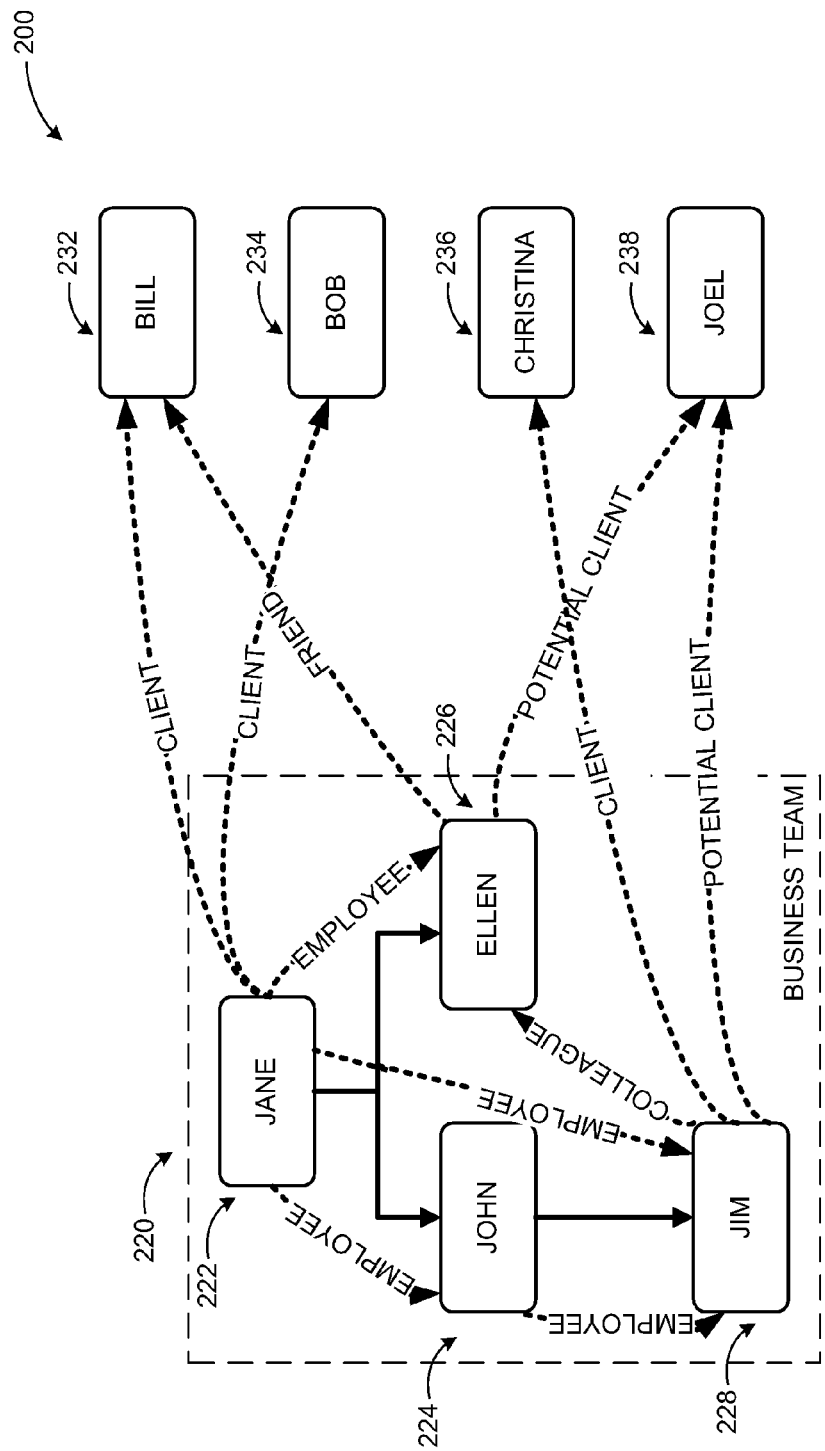
FIG. 2 is a diagram illustrating example entities and their relationships.

FIG. 2 is a diagram illustrating example entities and their relationships. Diagram 200 shows business team 220 where Jim 228, John 224, and Ellen 226 report to Jane 222. Thus there are employee relationships between Jane and the others. Furthermore, Jim 228 reports to John 224 with another employee relationship. In addition, Jim 228 has a colleague relationship to Ellen 226. Business team 220 and the team members are entities for a system keeping track of, for example, business activities of the team.

Additional entities include contacts Bill 232, Bob 234, Christina 236, and Joel 238. Different relationships may exist between the entities of business team 220 and the contacts. For example, Jane 222 may have a client relationship to Bill 232 and Bob 234. Ellen 226 may have a potential client relationship to Joel 238 and a friend relationship to Bill 232. Jim 228 may be associated with Christina 236 and Joel 238 with client and potential client relationships, respectively.

As discussed previously, entities of the system may have attributes (e.g. roles) based on a context of their relationship with other entities. For example, Bill 232 has a friend role as part of his connection to Ellen 226, but a client role as part of his connection to Jane 222. This distinction may be useful data for Jane 222, but she can only retrieve that information if the relationships and entity attributes within relationship context are preserved.

Roles are a significant attribute for entities. As described above, the role of an entity may provide important and useful information for business intelligence, forecasting, and similar purposes. In addition to a basic "any to any" relationship capability, a set of supporting capabilities related to the roles may be applied to a connection between two entity records. The roles are essentially "labels" that are defined such that they can be applied to both entities (e.g. friend, partner), applied to one entity implying the other entity (e.g. stakeholder, influencer), applied to one entity rendering the other unnecessary (e.g. leader, decision maker), or applied to both entities as a combination role (e.g. employer-employee, mother-daughter). Relationship attributes and associated entity attributes may be set based on the category of role(s).

Figure 3:
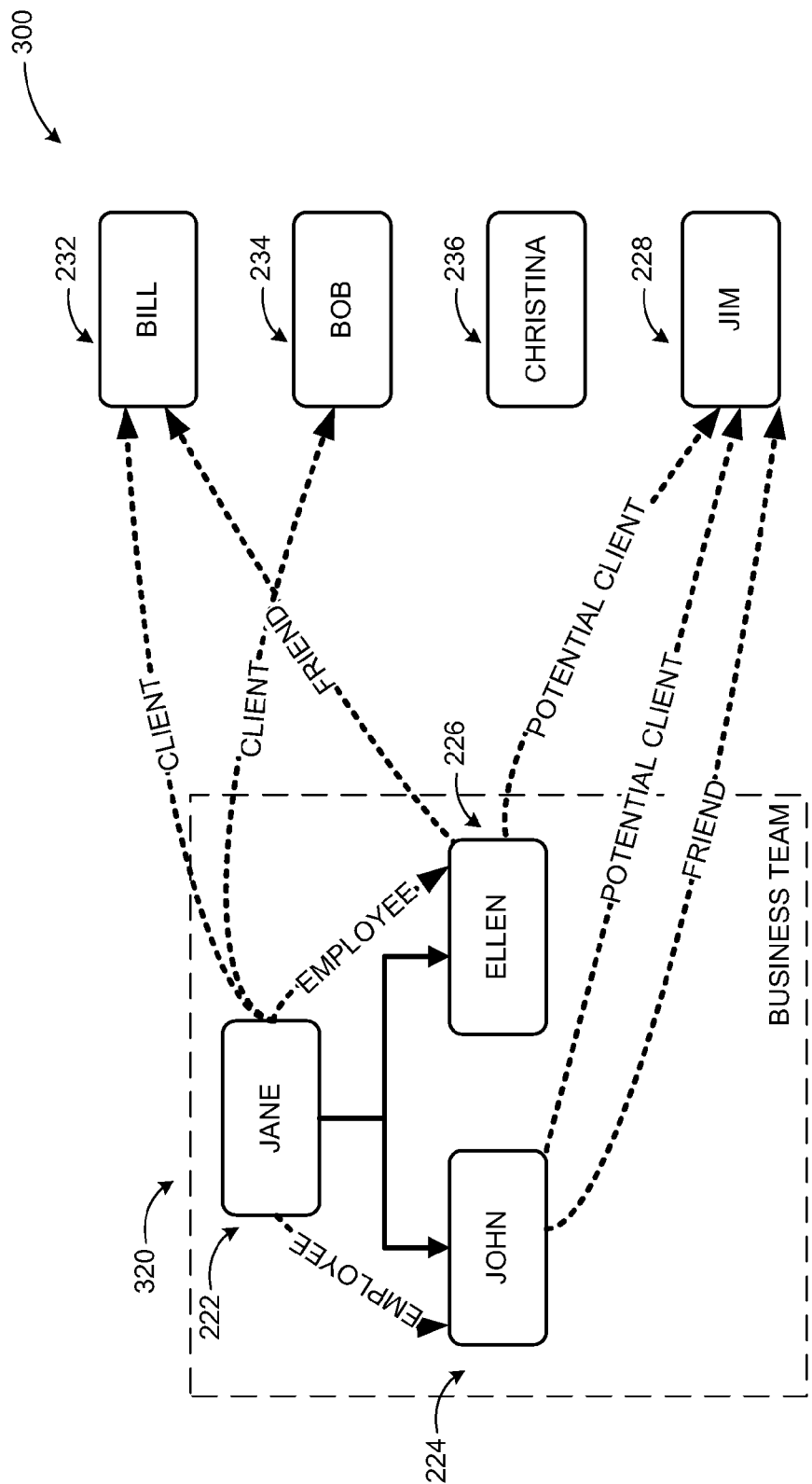
FIG. 3 is a diagram illustrating the example entities and relationships of FIG. 2 after a change in the entities.

FIG. 3 is a diagram illustrating the example entities and relationships of FIG. 2 after a change in the entities. In diagram 300, a majority of the entities and their relationships are the same as in diagram 200 of FIG. 2. To illustrate and effect of entity change on relationships and entity attributes, Jim 228 has been removed in business team 320 and replaced Joel 238. As a result Joel's potential client role has been extinguished. Since Jim 228 is now outside the business team, he has become a potential client for John 224 and Ellen 226. In addition, Jim 228 is in a friend relationship with John 224. Thus, by the change of positions of entities Jim 228 and Joel 238, Jim 228 has acquired new role(s). Christina 236 also has no role in the new arrangement. Having the knowledge of these changes and the new roles/relationships may help Jane 222 adjust her business strategies accordingly, modify her forecasts, and perform other operations. Furthermore, relationship records may include additional information (attributes) about the relationships themselves, as discussed below, enabling consumers of the data to enhance their decision making process. For example, a connection record may be configured to record an effective date range. This may add another dimension to the decision process based on relationship data. Decision makers may know what a person's role was before a current role, what the relationships looked like at a particular time, and so on.

Figure 4:
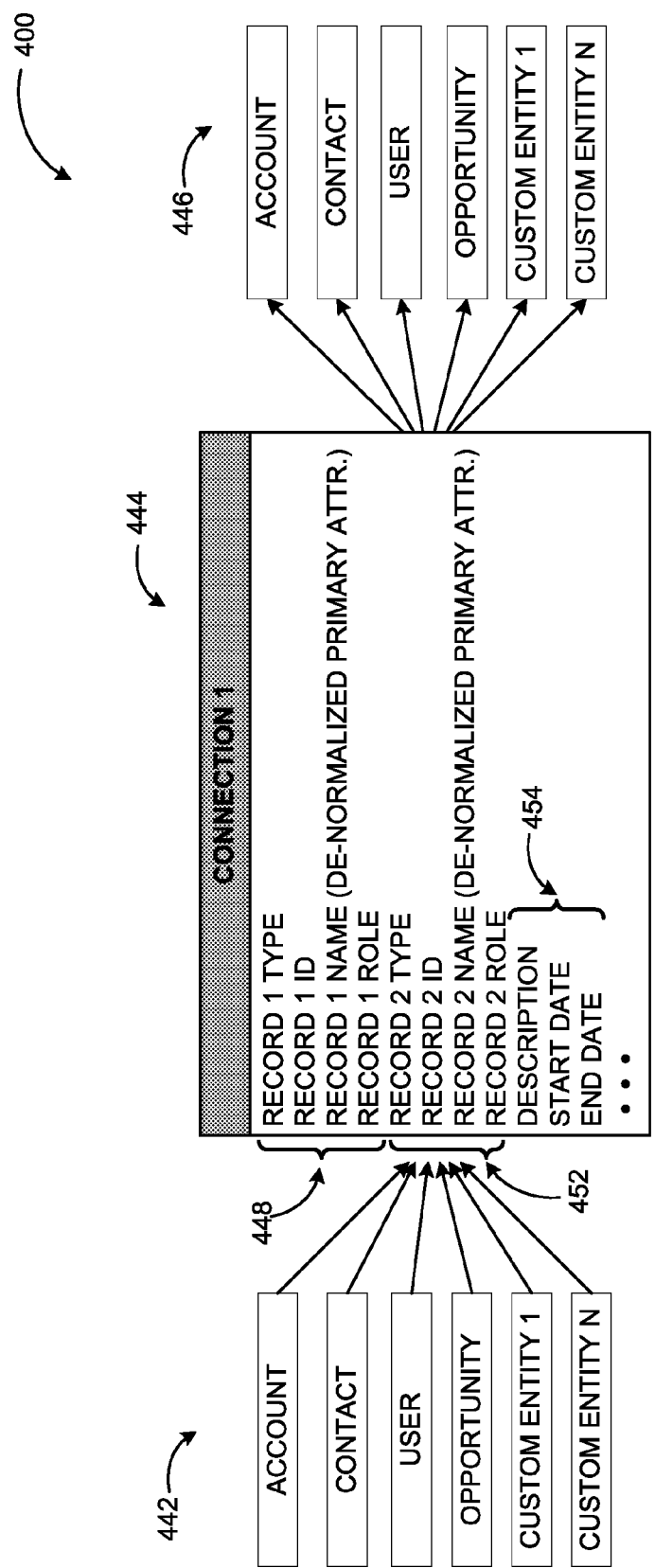
FIG. 4 illustrates an example relationship record connecting two entities according to embodiments.

FIG. 4 illustrates an example relationship record connecting two entities according to embodiments. As discussed previously, relationship records may include information defining an association between two or more entities (or records), their attributes in context of the relationship, and one or more relationship attributes associated with the relationship itself. Each connection may be preserved as a single and distinct record or multiple connections may be stored together in a table. Furthermore, the relationship data along with the entity data may be stored in a variety of data structures such as nested, flat, and comparable structures.

On diagram 400, various entities to be associated are listed on either side of the diagram as entities 442 and 446. Example entities include, but are not limited to accounts, contacts, users, opportunities, and custom ones. The entities may also be referred to as records, since each entity is represented in the data management system as a record. Relationship record 444 represents connection 1 associating a record 1 and a record 2. Record 1 and record 2 may be any two of the entities 442 and 446, respectively.

A type parameter (e.g. an Object Type Code "OTC") may be used to identify the entity type and an identifier ("ID") to identify the entity instance. The identifier may be a Globally Unique Identifier (GUID) in a specific example implementation. Additionally, a primary attribute (e.g. Name) may be de-normalized from the related entity into the connection table so that this information is available for display with simple queries. Moreover, a role of the entity within the context of the relationship may also be recorded. Thus, type, ID, de-normalized primary attribute, and role of each of the associated entities (record 1 and record 2) are stored in the relationship record 444 as shown by reference numerals 448 and 452.

Relationship attributes 454 may include a description field enabling users to input a custom description for the particular relationship, a start and an end date for the relationship, and/or similar attributes. Some fields in relationship record 444 such as record roles or relationship attributes may be selected by a user among predefined types or custom input.

Specific example elements such as entities, attributes, connections have been described above in describing implementation of various embodiments. Embodiments are not limited to those examples, however, and may be implemented with other entities, attributes, connections, data storage and management systems, and comparable elements using the principles described herein.

Figure 5:
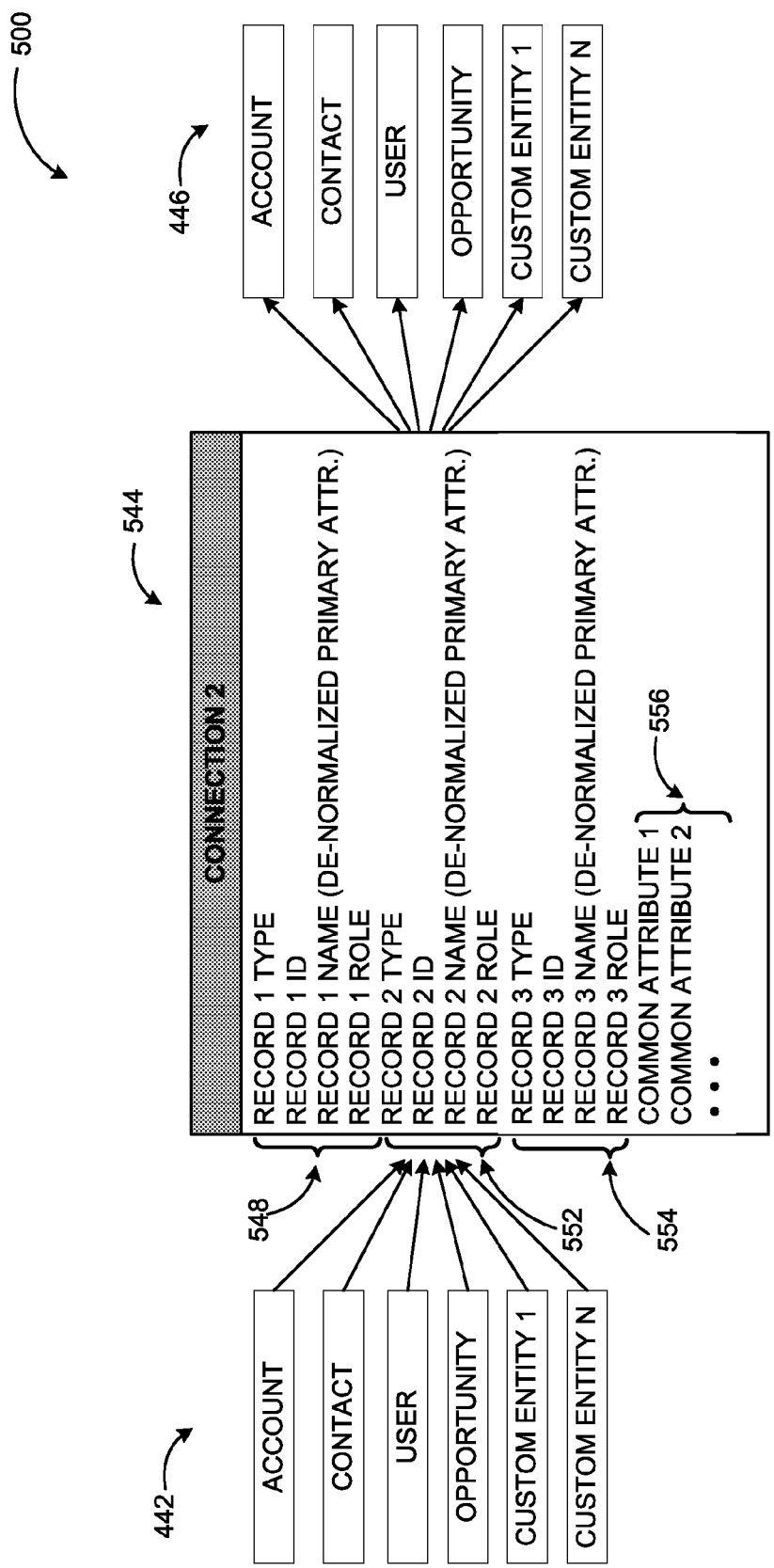
FIG. 5 illustrates an example relationship record connecting three entities according to embodiments.

FIG. 5 illustrates an example relationship record connecting three entities according to embodiments. A data model employing relationship records and entity attributes based on relationship context is not limited to connections between two distinct entities. As illustrated in diagrams 200 and 300 of FIG. 2 and FIG. 3, one entity may be connected to a plurality of entities or a plurality of entities may be connected to a single one.

While entities 442 and 446 in diagram 500 are the same as in diagram 400 of FIG. 4, relationship record 544 representing connection 2 includes type, ID, de-normalized primary attribute, and role information for record 1 (548), record 2 (552), and record 3 (554). The information may connect records 2 and 3 representing two entities with record 1 of a third entity. Relationship record 544 also includes common attributes 1 and 2 (556) associated with connection 2.

Figure 6:
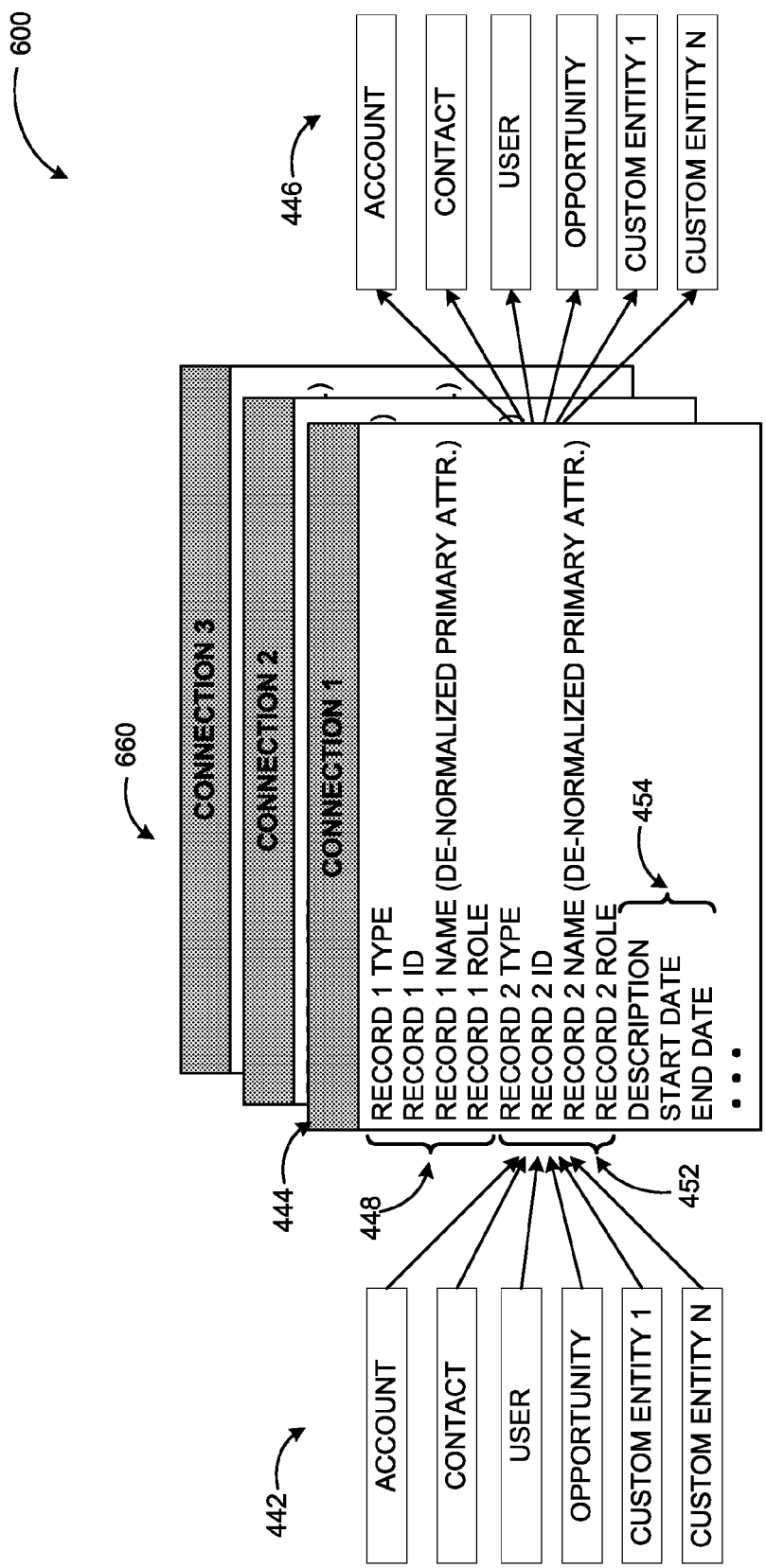
FIG. 6 illustrates a plurality of example relationship records connecting entities according to embodiments.

FIG. 6 illustrates a plurality of example relationship records connecting entities according to embodiments. Relationship records may be stored in a variety of data structures. Diagram 600 shows example relationship records 660 where information associated with connections 1, 2, and 3 are stored as distinct records. As discussed previously, the information for separate connections may also be stored together within the same flat, nested, or even multi-dimensional structure.

A format of the relationship records may be selected such that the information may be readily retrieved and analyzed in the data management system. For example, multi-level drill downs may be performed to retrieve relationship and/or entity data.

The above discussed scenarios and example uses focus on analysis and forecasting in CRM and similar applications. Embodiments are not restricted to these uses. Other scenarios and applications may utilize a relationship based data model using the principles described herein. For example, relationship and relationship based entity attribute information may be employed in conjunction with scheduling or calendaring applications as part of contacts information, with presence based systems, and comparable ones.

Figure 7:
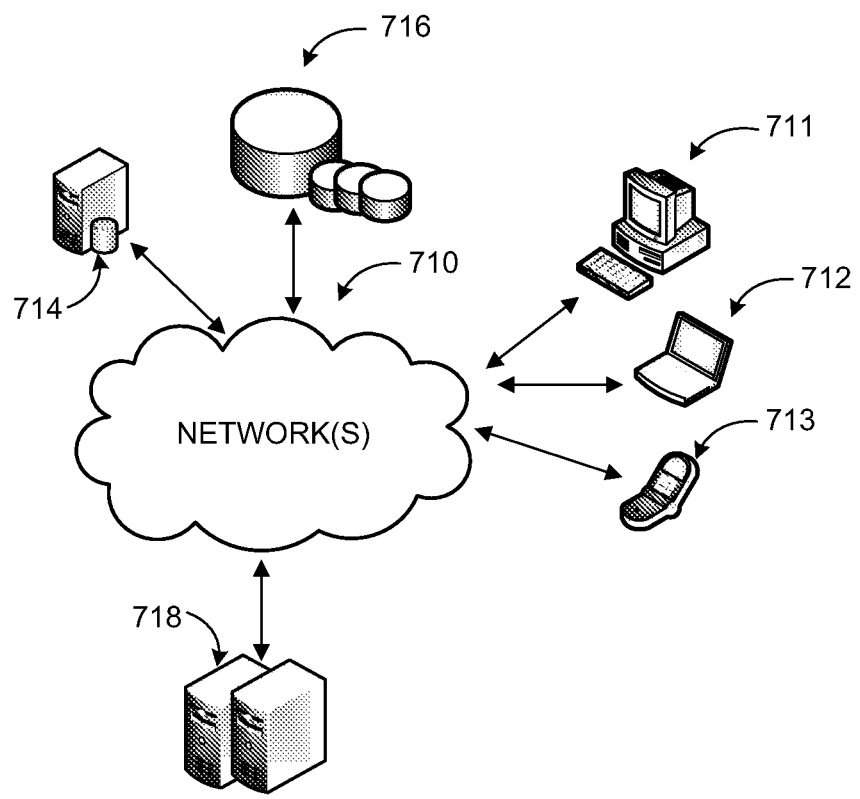
FIG. 7 is a networked environment, where a system utilizing a relationship data model according to embodiments may be implemented.

FIG. 7 is an example networked environment, where embodiments may be implemented. A platform providing management of entities with an ad hoc relationship data model may be implemented via software executed over one or more servers 718 such as a hosted service. The platform may communicate with client applications on individual computing devices such as a cellular phone 713, a laptop computer 712, and desktop computer 711 (client devices) through network(s) 710.

Client devices 711-713 may be used to provide access for users to a hosted service for managing entity based data such as a CRM service. The CRM service may employ a relationship data model as described previously to track ad hoc relationships between any entities and relationship attributes. The preserved data may be used to present information to users, perform analyses, forecasting reports, and comparable operations. Entity and/or relationship data may be provided by user input through any one of the client devices 711-713 or by an automated application executed on one of the client devices or one of the servers 718. Information associated with the entities, relationships, and other parameters of the system may be stored in one or more data stores (e.g. data store 716), which may be managed by any one of the servers 718 or by database server 714.

Network(s) 710 may comprise any topology of servers, clients, Internet service providers, and communication media. A system according to embodiments may have a static or dynamic topology. Network(s) 710 may include a secure network such as an enterprise network, an unsecure network such as a wireless open network, or the Internet. Network(s) 710 may also coordinate communication over other networks with additional servers, client devices, and other specialized computing devices. Network(s) 710 provides communication between the nodes described herein. By way of example, and not limitation, network(s) 710 may include wireless media such as acoustic, RF, infrared and other wireless media.

Many other configurations of computing devices, applications, data sources, and data distribution systems may be employed to implement a system employing relationship data model. Furthermore, the networked environments discussed in FIG. 7 are for illustration purposes only. Embodiments are not limited to the example applications, modules, or processes.

Figure 8:
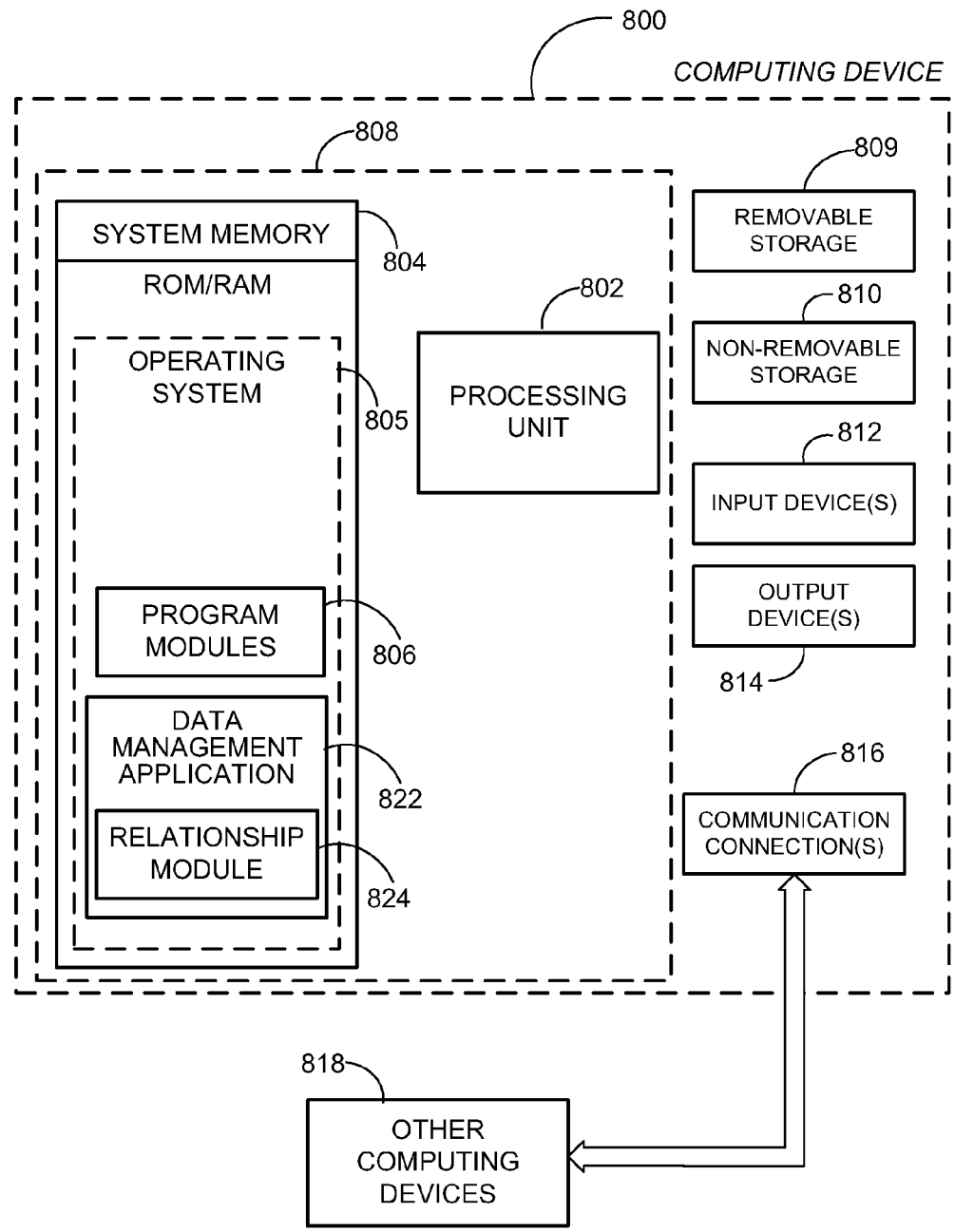
FIG. 8 is a block diagram of an example computing operating environment, where embodiments may be implemented.

FIG. 8 and the associated discussion are intended to provide a brief, general description of a suitable computing environment in which embodiments may be implemented. With reference to FIG. 8, a block diagram of an example computing operating environment for an application according to embodiments is illustrated, such as computing device 800. In a basic configuration, computing device 800 may be a server in a CRM system and include at least one processing unit 802 and system memory 804. Computing device 800 may also include a plurality of processing units that cooperate in executing programs. Depending on the exact configuration and type of computing device, the system memory 804 may be volatile (such as RAM), non-volatile (such as ROM, flash memory, etc.) or some combination of the two. System memory 804 typically includes an operating system 805 suitable for controlling the operation of the platform, such as the WINDOWS® operating systems from MICROSOFT CORPORATION of Redmond, Wash. The system memory 804 may also include one or more software applications such as program modules 806, data management application 822, and relationship module 824.

Data management application 822 and relationship module 824 may be separate applications or integral modules of a hosted service that provides CRM or comparable services to client applications/devices that utilize entity and relationship information. Relationship module 824 may receive connection information from a subscriber associated with the CRM system or an automated application, create a relationship record with its own attributes and update the record whenever there is a change to the relationship itself or one of the entities associated by the relationship. This basic configuration is illustrated in FIG. 8 by those components within dashed line 808.

Computing device 800 may have additional features or functionality. For example, the computing device 800 may also include additional data storage devices (removable and/or non-removable) such as, for example, magnetic disks, optical disks, or tape. Such additional storage is illustrated in FIG. 8 by removable storage 809 and non-removable storage 810. Computer readable storage media may include volatile and nonvolatile, removable and non-removable media implemented in any method or technology for storage of information, such as computer readable instructions, data structures, program modules, or other data. System memory 804, removable storage 809 and non-removable storage 810 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer readable storage media may be part of computing device 800. Computing device 800 may also have input device(s) 812 such as keyboard, mouse, pen, voice input device, touch input device, and comparable input devices. Output device(s) 814 such as a display, speakers, printer, and other types of output devices may also be included. These devices are well known in the art and need not be discussed at length here.

Computing device 800 may also contain communication connections 816 that allow the device to communicate with other devices 818, such as over a wireless network in a distributed computing environment, a satellite link, a cellular link, and comparable mechanisms. Other devices 818 may include computer device(s) that execute communication, data storage, analysis, presentation, and similar applications employing the entity and relationship data. Communication connection(s) 816 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 9:
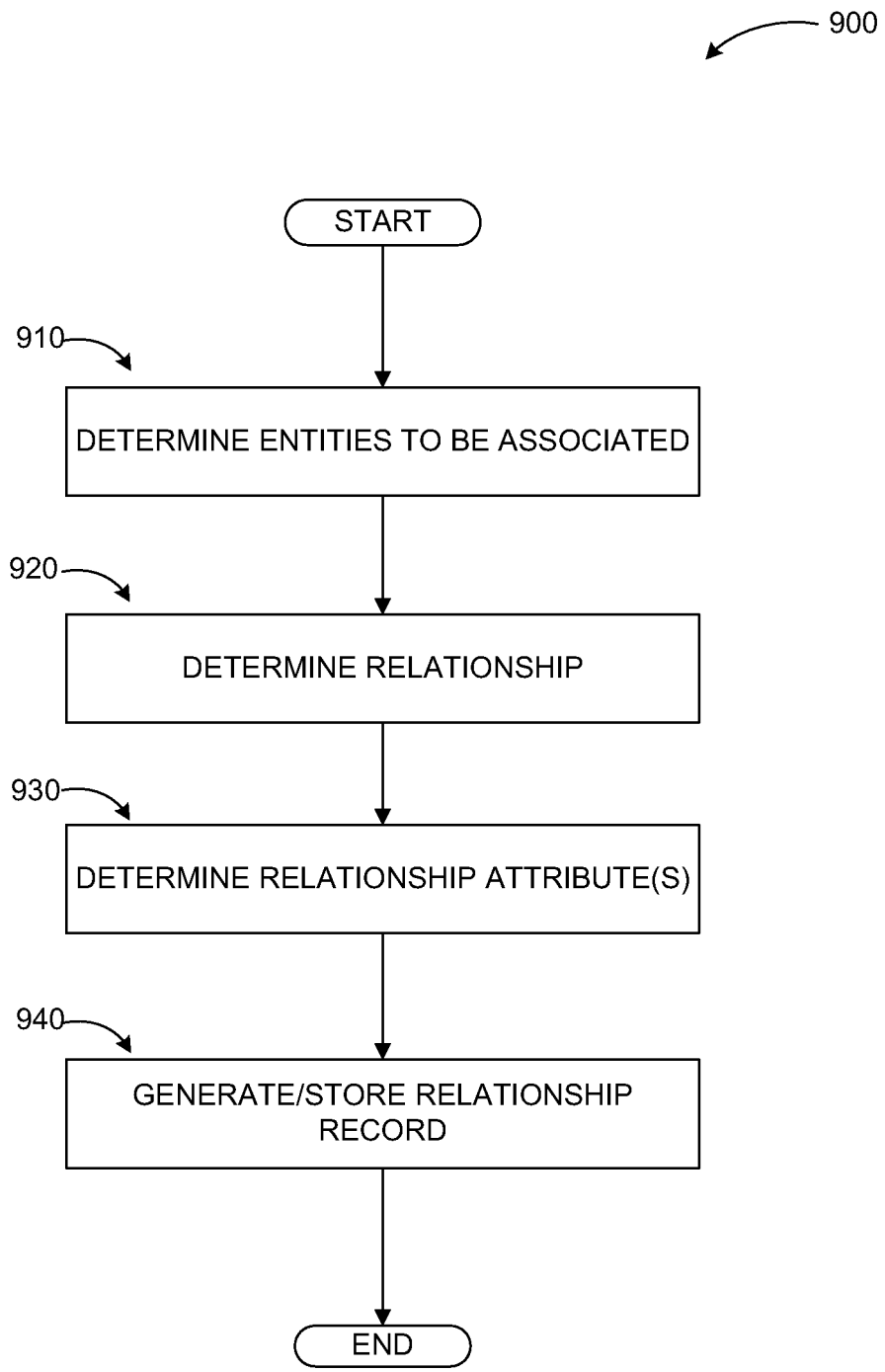
FIG. 9 illustrates a logic flow diagram for employing relationship data model for creating ad hoc relationships between entities according to embodiments.

FIG. 9 illustrates a logic flow diagram 900 for employing relationship data model for creating ad hoc relationships between entities according to embodiments. Process 900 may be implemented at a data management server as part of a CRM system such as the one described above in conjunction with FIG. 1.

Process 900 begins with operation 910, where entities to be associated are determined. The entities to be determined may be provided to the system by user input or by an application through an automatic process. Processing proceeds to operation 920 from operation 910.

At operation 920, a relationship between the entities is determined. This determination may also be provided to the system by user input or by an application through an automatic process. The determination may be made through selection among default relationships or through custom definition. Furthermore, the definition of the relationship may imply one or more attributes of the associated entities within the context of the relationship such as entity roles. Processing continues to operation 930 from operation 920.

At operation 930, relationship attributes are determined. Relationship attributes are common attributes associated with the relationship as opposed to independent attributes of associated entities. Examples include a description of the relationship, a validity period of the relationship, and similar attributes. Processing advances to operation 940 from operation 930.

At operation 940, a relationship record is generated/stored such that system wide operations including, but not limited to, analysis, forecasting, presentation, and the like, may be performed on the data. The operations included in process 900 are for illustration purposes. Employing an ad hoc relationship data model in CRM systems may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for managing ad hoc relationships between entities, the method comprising:
    determining at least two entities to be associated;
    associating the at least two entities from a set of: accounts, contacts, users, opportunities, and custom entities;
    determining a relationship associating the at least two entities, wherein the relationship is provided by at least one of: user input and an automatic process;
    determining a first attribute of the at least two entities that is not capturable by a query;
    determining a second attribute of the at least two entities that is in an unstructured format;
    de-normalizing a primary attribute from one of the first attribute and second attribute of the at least two entities that is in a queriable, structured format;

determining at least one attribute of the relationship;
determining a secondary supporting role for each of the at least two entities;
assigning a type parameter and an identifier to the at least two entities; and
generating a relationship record representing a connection relationship between the at least two entities and containing connection data in a single customizable intersect table enabling efficient queries over the connection data, wherein the relationship record defines the associated entities, their relationship, the first attribute and the second attribute of the at least two entities, the de-normalized primary attribute of the at least two entities in a queriable and structured format, the secondary supporting roles, the type parameters, and the at least one attribute of the relationship.

2. The method of claim 1, further comprising:
storing the generated relationship record enabling at least one from a set of: an analysis, a query, a forecast operation, a presentation operation, a contact information based operation, and a presence information based operation based on the stored relationship record and entity information.

3. The method of claim 1, wherein the entities include at least one from a set of: a person, a group, a business component, and a business aspect.

4. The method of claim 1, wherein the relationship attribute is determined by one of: selection from a default group of attributes and definition of a custom attribute.

5. The method of claim 1, wherein the at least one attribute of the entities based on the context of the relationship is determined by one of: selection from a default group of attributes and definition of a custom attribute.

6. The method of claim 5, wherein the at least one attribute of the entities based on the context of the relationship includes a role.

7. The method of claim 6, wherein the role is one of: to be applied to all associated entities, to be applied to one entity and to be implied for other entities, to be applied to one entity rendering a role for the other entities unnecessary, and to be applied to all entities as a combination role.

8. The method of claim 1, wherein the relationship is determined through one of: dynamic discovery and user definition.

9. The method of claim 1, the relationship record includes at least one from a set of: an entity type for each entity, an entity instance for each entity, a primary attribute for each entity, a role for each entity based on the context of the relationship, and the at least one relationship attribute.

10. The method of claim 9, wherein the at least one relationship attribute includes one of: a description of the relationship, a history of the relationship, a validity period of the relationship, a start date for the relationship, and an end date for the relationship.

11. A computing device for managing ad hoc relationships between two entities in a Customer Relationship Management (CRM) system, the computing device comprising:
a memory configured to store instructions;
a processor coupled with the memory, wherein the processor is configured to:
receive user indication of two entities to be associated;
associate the two entities from a set of: accounts, contacts, users, opportunities, and custom entities;
present a plurality of default relationships for associating the entities;
receive one of: a user selection among the plurality of relationships and a user defined custom relationship for associating the entities;
determine a first attribute of the at least two entities that is not capturable by a query;
determine a second attribute of the at least two entities that is in an unstructured format;
de-normalize a first primary attribute from one of the first attribute and second attribute of the at least two entities that is in a queriable, structured format;
determine a relationship context based attribute for at least one of the associated entities;
determine one or more attributes of the relationship;
include at least one common attribute from the one or more attributes, in the relationship;
determine a secondary supporting role for each of the two entities;
assign a type parameter and a unique identifier to the entities; and
store the type parameter of the entities, the secondary supporting roles of the entities, the unique identifier of the entities, an identifier of the relationship, the first attribute and the second attribute of the at least two entities, the relation context based attribute of the entities, the de-normalized first primary attribute of the at least two entities in a queriable and structured format, and the at least one attribute of the relationship as a relationship record in a customizable intersect table, wherein the relationship record represents a connection relationship between the at least two entities and includes connection data enabling efficient queries over the connection data included in the relationship record.

12. The computing device of claim 11, wherein-the processor is further configured to:
make the stored relationship record available for one of: an analysis application, a query application, a forecast application, a presentation application, a scheduling application, a data mining application, and a presence application.

13. The computing device of claim 11, wherein the relationship record includes: an Object Type Code (OTC) for identifying each entity, a Globally Unique Identifier (GUID) for identifying each entity instance, a primary attribute of each entity, and a role for each entity.

14. The computing device of claim 13, wherein the first primary attribute and the second primary attribute is a name assigned to the entity.

15. The computing device of claim 13, wherein the role is based on relationship context and a first role for a first one of the associated entities determines a second role for a second one of the associated entities.

16. The computing device of claim 13, wherein the role is determined automatically based on the relationship.

17. A system for managing ad hoc relationships between entities, the system comprising:
a computing device for executing a client application configured to:
enable a user to identify at least two entities to be associated;
enable the user to identify a relationship associating the at least two entities;
identify a first attribute of the at least two entities that is not capturable by a query and a second attribute of the at least two entities that is in an unstructured format;
de-normalize a first primary attribute from one of the first attribute and second attribute of the at least two entities that is in a queriable, structured format;
identify attributes associated with the relationship;

include common attributes from the identified attributes, in the relationship;
determine a secondary supporting role for each of the at least two entities;
assign a type parameter and a unique identifier to the at least two entities; and
de-normalize a primary attribute from one of the at least two entities as a queriable attribute; and a server for executing a hosted service configured to:
receive the at least two entities, the relationship, the first attribute and the second attribute of the at least two entities, the de-normalized first primary attribute of the at least two entities in a queriable and structured format, and the attributes associated with the relationship, wherein the attributes associated with the relationship include an attribute associated with each entity, the secondary supporting role for each entity, and the de-normalized primary attribute;
generate a relationship record in a single customizable intersect table, wherein the relationship record represents a connection relationship between the at least two entities and includes connection data enabling efficient queries over the connection data included in the relationship record, and wherein the relationship record includes the type parameter of the at least two entities, the unique identifier of the at least two entities, identifiers associated with the entities, the relationship, the first attribute and the second attribute of the at least two entities, the de-normalized first primary attribute of the at least two entities in a queriable and structured format, and the attributes associated with the relationship;
store the relationship record along with entity data to enable enhanced processing of the entity data employing a context of the relationship in a format that enables multi-level drill downs to retrieve relationship and entity data; and
detect a change in at least one of the associated entities;
determine a new relationship between the associated entities with the changed entity and at least one new attribute of the associated entities with the changed entity that is based on a context of the new relationship;
update the relationship record with the new relationship and the at least one new attribute for the associated entities with the changed entity; and
utilize the relationship record, including the connection data and the entity data to analyze, forecast, report, and present a dynamic relationship between the at least two entities.

18. The system of claim 17, wherein the entity data and the relationship record are stored within distinct data structures including one of: a flat data structure, a nested data structure, and a multi-dimensional data structure.

19. The system of claim 18, wherein the entity data and the relationship record are stored within the same data structure.

20. The system of claim 18, wherein the relationship associates one of: a single entity with a plurality of entities and a plurality of entities with a single entity.

* * * * *